Patented Feb. 13, 1951

2,541,902

UNITED STATES PATENT OFFICE 2,541,902

N'-SUBSTITUTED-3-PYRIDINE SULFONAMIDES

Mitchell F. Zienty, Elkhart, Ind., assignor to The Upjohn Company, Kalamazoo, Mich., a corporation of Michigan No Drawing. Application January 28, 1948, Serial No. 4,943

7 Claims. (Cl. 260—295)

The present invention relates to N'-substituted-3-pyridine-sulfonamides.

The compounds of this invention are N'-alkyl-3-pyridine-sulfonamides having the general formula:

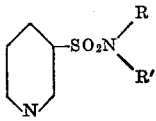

wherein R represents an alkyl radical having from 8 to 16 carbon atoms, inclusive, and R' represents hydrogen or an alkyl radical having from 8 to 16 carbon atoms, inclusive. The aliphatic hydrocarbon radicals can be either straight or branched chain radicals. The amido nitrogen is represented herein by the symbol "N'."

The N'-alkyl-3-pyridine-sulfonamides of the present invention are of value in chemical synthesis. They are of particular value in the synthesis of germicidally active quaternary ammonium salts, certain of which are described and claimed in a concurrently filed co-pending application, Serial No. 4,944, now Patent No. 2,473,121.

N'-alkyl-3-pyridine-sulfonamides can be prepared readily by reacting 3-pyridine-sulfonyl chloride with an appropriate primary or secondary aliphatic amine. Among the amines which can be used are primary and secondary 2-ethyl-n-hexyl, n-octyl, decyl, undecyl, dodecyl, tridecyl, tetradecyl and hexadecyl amines and many others. Secondary amines containing two different aliphatic radicals, such as lauryl myristyl amine, hexadecyl lauryl amine and tridecyl decyl amine, can be used if desired. The amines, which may contain either straight or branched chain alkyl radicals, can be represented by the generic formula HNRR' wherein R and R' have the values given previously.

The reaction of 3-pyridine-sulfonyl chloride with an amine is accomplished conveniently by mixing the amine and 3-pyridine-sulfonyl chloride together, preferably in an inert liquid diluent. Suitable inert diluents include hexane, octane, benzene, toluene, xylene, dibutyl ether and many others. Hydrocarbons boiling between about 60° and about 140° C. have been used with satisfaction, but the boiling range of the diluent is not critical. Diluents other than hydrocarbons which are inert under the reaction conditions can be used, if desired. The diluent can be omitted entirely in many instances, but best results are generally obtained when a diluent is employed. The reaction is vigorous and, although it may be carried out at any suitable temperature below the decomposition temperature of the the reactants, it is preferably carried out below about room temperature.

Any suitable proportions of reactants can be employed, and any unreacted excess of the one or the other removed from the final product during the isolation and purification steps. Hydrogen chloride is formed during the reaction along with the desired N'-alkyl-2-pyridine sulfonamide, and this tends to appear in the final reaction mixture as the hydrochloride of the amine used. Since the amine hydrochloride is not well suited for amide formation, it is preferable for highest yields to use about two mols of amine for each mol of acid chloride.

The N'-alkyl-3-pyridine sulfonamide can be obtained substantially free of amine hydrochloride by treating the reaction mixture with a liquid hydrocarbon, such as those mentioned previously, and filtering the mixture. The substituted amide is soluble whereas the amine hydrochloride is insoluble in the hydrocarbon. When a hydrocarbon diluent is used in carrying out the reaction, it may not be necessary to add a further quantity in order to effect the separation of the amine hydrochloride. The N'-alkyl-3-pyridine sulfonamides are recovered by evaporating the hydrocarbon solution to dryness followed by crystallization of the product, e. g. from a mixture of benzene and petroleum ether or from other suitable solvent.

Although the preparation of the new compounds has been described using 3-pyridine-sulfonyl chloride, it is apparent that other sulfonyl halides, e. g. 3-pyridine-sulfonyl bromide, can be used if desired and with equally satisfactory results.

The following examples are given for purposes of illustration only and are not to be construed as limiting.

Example 1

Ten grams of 3-pyridine-sulfonic acid was ground with 13.2 grams of phosphorous pentachloride and the mixture heated under reflux at 160°–165° C. until the evolution of hydrogen chloride ceased. This required two to three hours. Phosphorus oxychloride which was formed during the reaction was removed under reduced pressure. The residual yellowish oil, was crude 3-pyridine-sulfonyl chloride which was used in subsequent reactions without further purification. The yield was substantially theoretical.

Example 2

A solution in 50 milliliters of dry benzene of 3-pyridine-sulfonyl chloride prepared from 10 grams of 3-pyridine-sulfonic acid as in Example 1, was cooled in an ice bath to about 10° C. To this solution there was added 30 grams of hexadecyl-amine dissolved in 100 milliliters of dry benzene. A precipitate of hexadecyl amine hydrochloride which formed in the mixture was removed by filtration and the filtrate evaporated to dryness. The solid residue of crude N'-hexadecyl-3-pyridine sulfonamide was purified further by crystallization from a mixture of benzene and petroleum ether (B. P. 90°–100° C.) There was thus obtained 15 grams of colorless crystals of N'-hexadecyl-3-pyridine sulfonamide melting at 78°–79° C.

Anal. Calc'd for $C_{21}H_{38}O_2N_2S$; N:7.32
Found; N:7.07

Example 3

In substantially the manner described in Example 2, dodecyl amine, tetradecyl amine and di-(2-ethyl-n-hexyl) amine were reacted with separate portions of 3-pyridine sulfonyl chloride and the N'-alkyl-3-pyridine sulfonamides isolated and purified. The following properties were determined.

N'-dodecyl-3-pyridine sulfonamide was recovered in the form of crystals melting at 67°–68° C.

Anal. Calc'd for $C_{17}H_{30}O_2N_2S$; N:8.61
Found; N:8.75

N'-tetradecyl-3-pyridine sulfonamide was recovered in the form of crystals melting at 79°–80° C.

Anal. Calc'd for $C_{19}H_{34}O_2N_2S$; N:7.91
Found; N:7.71

N',N'-di(2-ethyl-n-hexyl)-3-pyridine sulfonamide was recovered as an almost colorless oil boiling at 253°–255° C. under a pressure of 16 millimeters of mercury.

Anal. Calc'd for $C_{21}H_{38}O_2N_2S$; N:7.32
Found; N:7.51

Other compounds of the invention which can be prepared substantially as by the method of Example 2 include, among many others, N'-n-octyl-3-pyridine sulfonamide, N'-pentadecyl-3-pyridine sulfonamide, N'-decyl-3-pyridine sulfonamide, N'-tridecyl-3-pyridine sulfonamide, N'-(2-ethyl-n-octyl)-3-pyridine sulfonamide, N'-undecyl-3-pyridine sulfonamide, N'-n-nonyl-3-pyridine sulfonamide, N',N'-di-dodecyl-3-pyridine sulfonamide, N',N'-di-decyl-3-pyridine sulfonamide, N',N'-di-undecyl-3-pyridine sulfonamide, N',N'-di-hexadecyl-3-pyridine sulfonamide, N'-hexadecyl-N'-undecyl-3-pyridine sulfonamide, N'-dodecyl-N'-tetradecyl-3-pyridine sulfonamide, N'-dodecyl-N'-hexadecyl-3-pyridine sulfonamide, N'-decyl-N'-tridecyl-3-pyridine sulfonamide, N'-undecyl-N'-(2-ethyl-n-hexyl)-3-pyridine sulfonamide.

I claim:

1. A compound having the following formula:

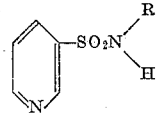

wherein R is an alkyl radical containing from 8 to 16 carbon atoms, inclusive.

2. N'-dodecyl-3-pyridine sulfonamide.
3. N'-tetradecyl-3-pyridine sulfonamide.
4. N'-hexadecyl-3-pyridine sulfonamide.
5. The method for producing N'-alkyl-3-pyridine sulfonamides which comprises: reacting, in a liquid diluent which is inert under the reaction conditions, a 3-pyridine-sulfonyl halide with an amine having the formula:

wherein R is a member of the group consisting of the alkyl radicals containing from 8 to 16 carbon atoms, inclusive, and R' is a member of the group consisting of hydrogen and alkyl radicals containing from 8 to 16 carbon atoms, inclusive; and separating from the reaction mixture a compound having the formula:

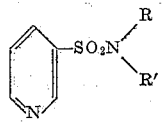

wherein R and R' have the values given.

6. The method of claim 5 wherein the reaction is carried out in a liquid hydrocarbon diluent and the reacted mixture is filtered to separate therefrom crystals of amine hydrochloride.

7. The method of claim 5 wherein the 3-pyridine-sulfonyl halide is 3-pyridine-sulfonyl chloride.

MITCHELL F. ZIENTY.

REFERENCES CITED

The following references are of record in the file of this patent:

UNITED STATES PATENTS

| Number | Name | Date |
|---|---|---|
| 2,236,168 | Dietrich | Mar. 25, 1941 |

OTHER REFERENCES

Moeller: Ber. 75B, 1108–1118 (1942).

Sidgwick: Organic Chemistry of Nitrogen by Taylor et al. (Oxford, at the Clarendon Press), page 522 (1942 edition).

Hartman: California Medicine, 66 (No. 4), 242–248 (1947).